United States Patent [19]

Khalifa

[11] Patent Number: 4,841,781
[45] Date of Patent: Jun. 27, 1989

[54] FLOW RECTIFIER FOR VORTEX FLOWMETER

[75] Inventor: Mohamed A. Khalifa, Greenwood, S.C.

[73] Assignee: Schlumberger Industries, Inc., Atlanta, Ga.

[21] Appl. No.: 129,122

[22] Filed: Dec. 4, 1987

[51] Int. Cl.⁴ ............................ G01F 1/32; F15D 1/04
[52] U.S. Cl. .................................. 73/861.22; 138/39; 73/198
[58] Field of Search ............... 73/198, 861.22, 861.66; 138/37, 39

[56] References Cited

U.S. PATENT DOCUMENTS

| | | | |
|---|---|---|---|
| 2,216,046 | 9/1940 | Peck | 138/39 |
| 2,292,246 | 8/1942 | Steffens | 138/39 |
| 3,185,181 | 5/1965 | Demyan | 138/37 |
| 3,895,531 | 7/1975 | Lambert | 73/861.66 |
| 4,058,141 | 11/1977 | Hasinger et al. | 138/39 |
| 4,397,192 | 8/1983 | Mollet | 73/861.22 |

FOREIGN PATENT DOCUMENTS 0110916  8/1980  Japan .............................. 73/861.22

Primary Examiner—Herbert Goldstein
Attorney, Agent, or Firm—Dale V. Gaudier

[57] ABSTRACT

An upstream flow conditioner (rectifier) for a vortex flowmeter. The flow conditioner is constructed with flow rectification vanes placed parallel to the axis of the vortex shedding body at the inlet section of the meter body or between flanges for short meter bodies and insertion meters. The vanes comprise three equally spaced apart flat strips which are inserted in slotted grooves on the inlet side of the meter body or on a plate that can be inserted between flanges. The thickness and the depth of the strips and their distance from the shedding body are optimized to ensure the reproduction of a desired turbulence level and mean fluid velocity profile in the plane perpendicular to the shedding body.

11 Claims, 3 Drawing Sheets

SECTION A-A

NO RECTIFICATION EFFECT

SECTION B-B

GOOD RECTIFICATION EFFECT

FLOW RECTIFIER FOR VORTEX FLOWMETER

BACKGROUND OF THE INVENTION

1. Field of the Invention

The invention relates to flowmeters and more particularly to a device for performing flow rectification mainly in one plane such as for use with a vortex flowmeter.

2. Description of the Prior Art

Fluid flowmeters utilizing an annular flow element, a paddle wheel, insertion and vortex flowmeters are examples of flowmeters which require that the approaching flow stream be conditioned or rectified in at least one plane. Because a vortex flowmeter amplifies the effect of flow irregularities present with most of these meters, it is a good example to use in explaining flow rectification in one plane.

The process of vortex shedding is based on stimulating existing hydrodynamic instabilities when a bluff body is placed in the flow stream over a certain Reynolds number range. The alternation of the shedding process to form the Karman Vortex street depends on interaction of the two shear layers on the two sides of the wake behind the body. This is why a vortex flowmeter is more sensitive to flow irregularities than some other types of flowmeters.

The flow irregularities of the approaching stream are produced by pipework upstream of the flowmeter. The installation of the meter downstream of pipe fittings such as valves, elbows and reducers results in flow irregularities. Meter misalignment, which leaves steps and gaps, and the protrusion of a gasket into the flow stream at the meter inlet, also lead to flow irregularities. The irregularities, due to pipe fitting, are usually handled by using a different pipework, allowing a certain minimum straight pipe length upstream of the meter, or using a flow straightener. Currently, none of these methods correct the problems caused by meter misalignment or eccentricity or flange problems at the meter inlet. Modification of the pipework and/or the provision of a long straight upstream pipe is sometimes impossible.

The use of flow straighteners upstream of the meter has been suggested to correct particular types of flow irregularities. Basically, there are four types of flow straighteners: the rectangular "egg crate" type known as the AMCA straightener, radial plates meeting at the pipe center known as the Etoile straightener, a bundle of tubes each having their axes parallel to the pipe, and a perforated plate type straightener.

As mentioned above, such flow straighteners do not correct irregularities that occur at the meter inlet due to gaskets, steps and gaps, eccentricity and misalignment. Straighteners must be placed at distances upstream the sensor element that depend on their type and the resulting interaction between the straightener and the sensor element in order to give accurate results. The wake of a flow straightener can adversely affect the sensor element. Some straighteners with lower pressure drop and shorter rectification distance can be placed closer to the meter. For example, U.S. Pat. No. 4,397,192 outlines the use of a mesh made of bars at the inlet section of a vortex meter for the purpose of improving its linearity, especially at Reynolds numbers less than 20,000.

It has been argued that certain level of upstream turbulence are favorable, especially when they are reproducible. This effect has been used in the case of a vortex flowmeter by Pankanin and Tyszkiewic to develop a shedding body based on what is known as the sunken stream effect (see *Proceedings of FLOMEKO 1983, IMEKO*).

It has been observed that the vortex shedding process requires rectification of the flow profile in the plane perpendicular to the axis of the shedding body such that the flow becomes symmetric with respect to the lines of separation where the vortices detach. The shedding process tolerates to a great extent the nonuniformity in the velocity profile along the separation edge. In part, this is because the vortex theorems of Helmoholtz state that a vortex filament must be either a closed tube or end on the boundaries of the fluid. The vortex tube tries to keep its coherence along the axis of rotation and resists the tearing effects when there is a tendency to form more than one vortex cell along the shedder bar. Most vortex flowmeters have shedders with a length to face width ratio $(l/d)$ in the neighborhood of three. The published data (see Mair and Stansby, *SIAM J. Appl. Math.*, 28(2), 519-540, 1975) on a very slender shedding body $(l/d=10)$ show that, even when the skewness in the flow profile along the shedding body is severe enough to produce a number of shedding cells, the cell sizes fit segments of the shedding body having $l/d=3$. In other words, with $l/d=3$, a very strong correlation along the axis of rotation of the shed vortex prevents it from breaking into several cells.

SUMMARY OF INVENTION

Contrary to many of the approaches taken in the prior art is has been discovered that for some class of flowmeters flow rectification in one plane suffices. Rectification in one plane means that the straighteners (flow rectifiers) can be as simple as using flat strips parallel to the plane of symmetry. Such a straightener is inexpensive to make and to install, durable and does not choke easily with contaminants as occur when meshes are used. The pressure drop and the rectification distance is smaller than those produced by the conventional straighteners. An optimized straightener designed in accordance with the principles of the present invention placed upstream of a flowmeter produces a repeatable level of turbulence similar to the sunken stream effect.

More particularly, the present invention comprise a flow straightener (rectifier) for rectifying the flow upstream of certain class of flowmeters such as those using an annular flow element, a paddle wheel, an insertion sensor, or a vortex flowmeter to overcome flow irregularities caused by both the presence of the flowmeter and pipework irregularities. It has been found that a set of three short vanes aligned substantially parallel to the sensor element (such as the shedding body or strut in the case of the vortex flowmeter) and mounted on the inlet side of the meter can provide the required degree flow rectification. The provision of three equally spaced slots on the inlet side of the meter allows easy installation of the strips (vanes) that form the flow straightener. The leading and the trailing edges of the strips are rounded to provide a low pressure drop. The blockage ratio is very small $(t/D=0.05)$, where t is the vane thickness and D is the pipe diameter.

It has been found that the flow sensing element (i.e. the shedding body in the case of a vortex flowmeter) should be placed at a distance of between one to two pipe diameters downstream of the vanes. For insertion flowmeters, the use of the simple flow straightening vanes at a flange located one to two pipe diameters upstream of the fluid flow sensing element overcomes the problem of observing the flow profile which may be skewed in a plane perpendicular to the observed plane of interest.

The vanes can be easily added to any flowmeter simply by machining slots on the inlet side of the meter, so long as the distance between the fluid flow sensing element and the vanes is kept within the aforementioned optimum range.

When the meter body is short or an insertion type meter is used, a plate carrying the vanes can be inserted in between a flange provided on the meter section and an auxiliary flange which has the same diameter as the pipe. The plate may be of sufficient thickness to place the vanes within the optimum range of distance from the fluid flow sensing element. Advantageously, the rectification of the flow profile by the flow straighten enables the meter to tolerate some upstream disturbances that might otherwise affect the performance of the meter, such as its linearity and the fading and the jittering of the vortex train in the case of vortex flowmeters. Upstream pipeline disturbances range from variations in the turbulence fluctuations to severe skewing of the mean velocity profile of the fluid. These disturbances result from the upstream piping configuration and meter installation discrepancies and misalignment. The described flow straightener helps reproduce the required flow pattern upstream of a measuring device.

BRIEF DESCRIPTION OF THE DRAWING FIGURES

These and other features and advantages of the present invention will be more clearly understood from the following detailed description of the preferred embodiment of the invention when taken with the accompanying drawing figures wherein.

DETAILED DESCRIPTION OF THE PREFERRED ENVOLVEMENT

Figure 1:
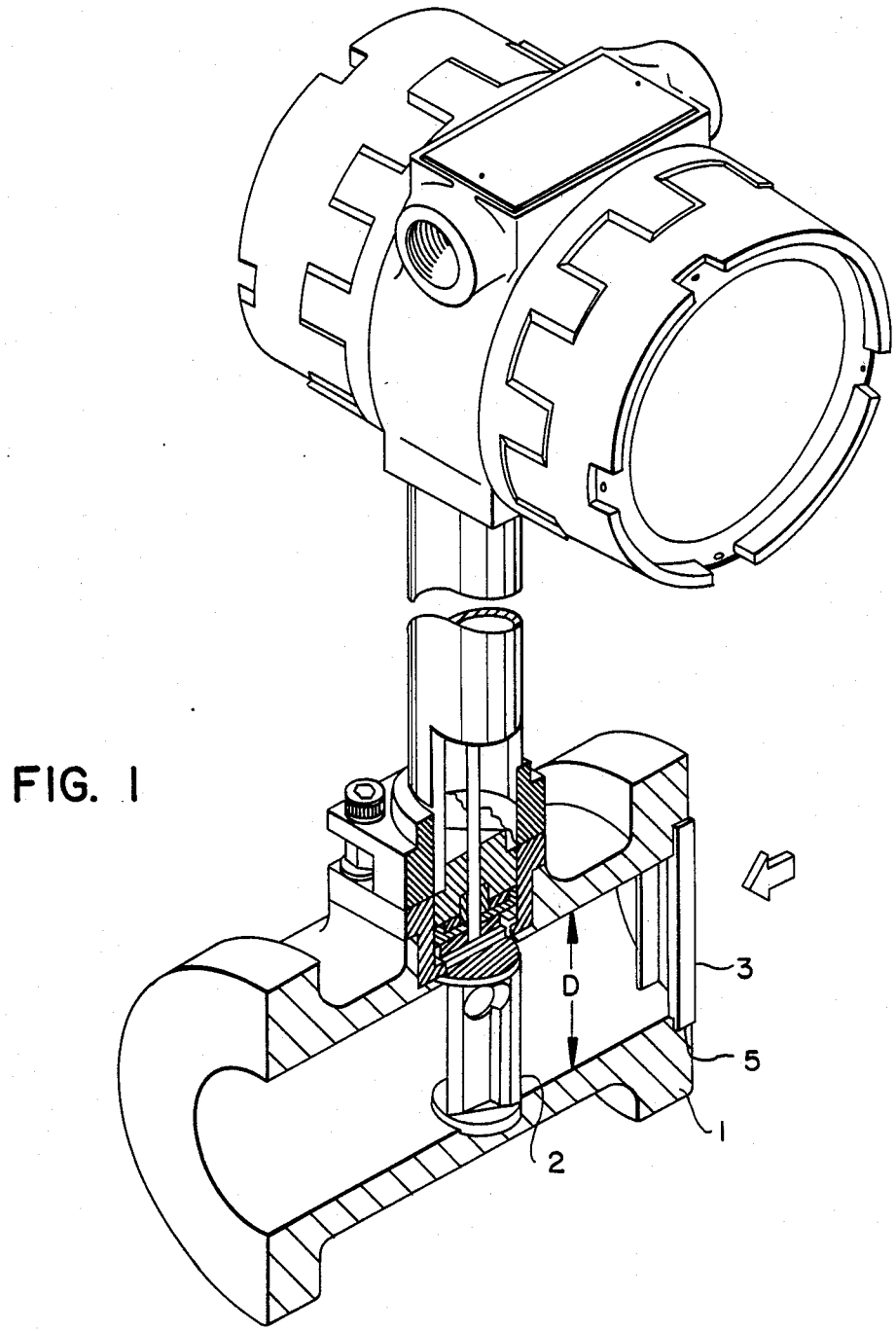
FIG. 1 is a broken perspective view of a vortex flowmeter and flow rectifier constructed in accordance with the present invention.
Figure 3:
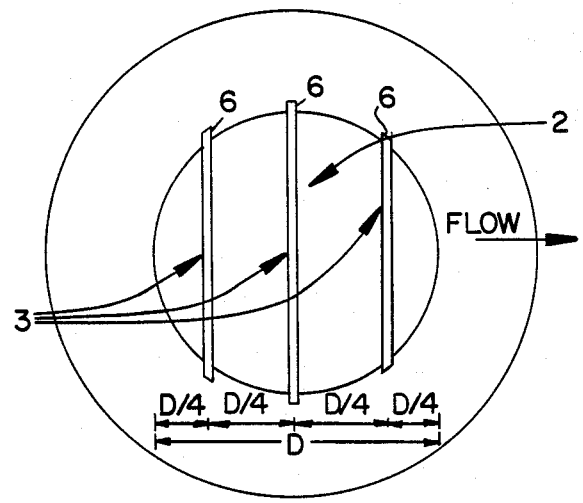
FIG. 3 is a front plan view showing a flow rectifier constructed in accordance with the principles of the present invention.
Figure 2:
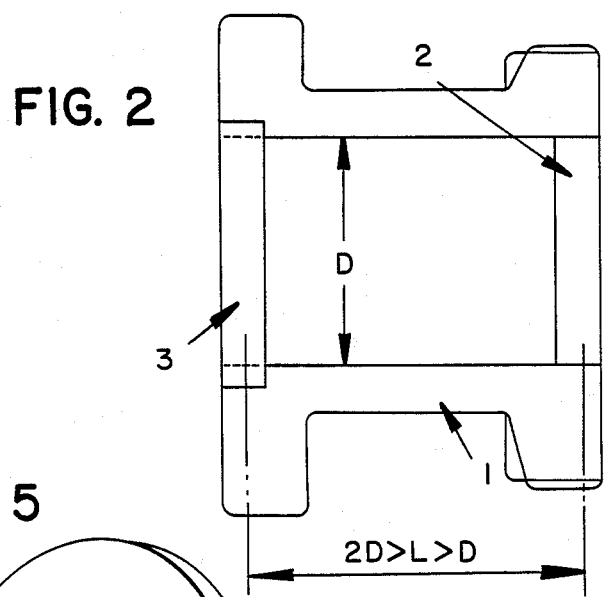
FIG. 2 is a cross-section view of the flowmeter of FIG. 1 taken along lines 2—2.

Referring to FIGS. 1 and 2, the flowmeter body, which can be a wafer or a flanged type, is shown at 1. The vortex generator element (e.g. a shedding body or strut) 2 spans the bore of the meter body in a conventional manner perpendicular to the fluid flow whose direction is indicated by an arrow in FIGS. 1 and 2. On the inlet side of the meter body, a flow rectifier comprised of three vanes 3 is mounted in three slots 6 formed on the meter body itself. Vanes 3 are three equally spaced strips of material aligned with the strut shedding edges as shown in FIG. 3.

Figure 4:
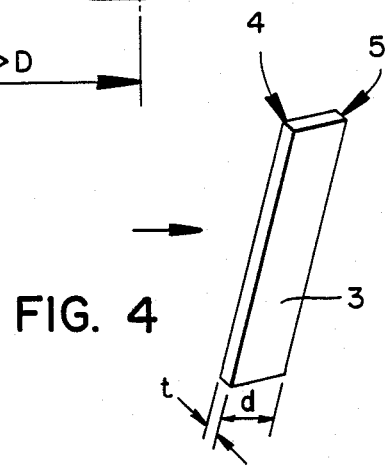
FIG. 4 is a perspective view of a vane which can be used in the flow straightener of FIG. 3.

A single vane or strip is shown in FIG. 4. The leading and trailing edges of each vane is rounded to minimize the pressure drop. The depth of the vanes d is equal to 0.25 to 0.125 the bore diameter D of the meter. The thickness t of each vane equals 0.05 the bore diameter D. It has been found that vanes 3 should be placed at an upstream distance L from strut 2 equivalent to one to two bore diameters (D) as shown in FIG. 2.

Figure 5:
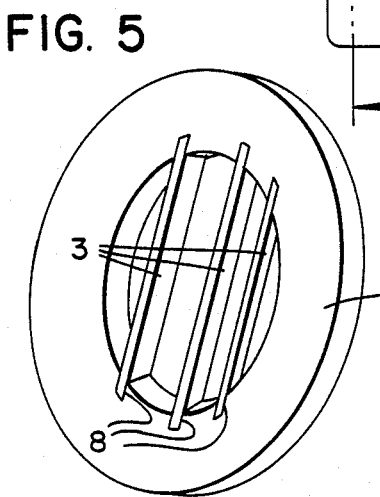
FIG. 5 is a perspective view of a plate-type flow rectifier.

An alternative method for mounting rectifying banes 3 is shown in FIG. 5. A mounting plate 7 of the same or different thickness as compared to the vane depth d is provided with slots 8 for receiving vanes 3. Plate 7 can be clamped in between a flange present on the meter body and an auxiliary flange at the recommended upstream distance from the vortex shedding body. The thickness of plate 7 may be varied to place the vanes at a desired distance upstream of th fluid flow serving element 2. This allows the vanes to be used on short meter bodies where the distance between the meter's inlet section and the shedding body is less than one bore diameter (D). It also allows the flow rectifier to be used upstream of an insertion type vortex flowmeter. In this latter case, care is taken to align the longitudinal axis of the vanes with the longitudinal axis of the shedding body (e.g. as shown in FIG. 3).

One of the advantages of having the flow straightener present at the meter inlet is that the wake of the vanes provides the required amount of turbulence which is necessary to simulate the sunken stream effect without harming the process of vortex formation in the case of a vortex flowmeter. Another advantage is that, not only can pipework irregularities and discrepancies be overcome, but meter installation discrepancies, such as steps and gaps at the flanges, gasket misalignment and eccentricity, can also be corrected. With the flow straightener of the present invention, the required amount of flow rectification is achieved with very easy to cut strips, a minimum pressure drop, and a minimum risk of clogging the pipeline.

Figure 6:
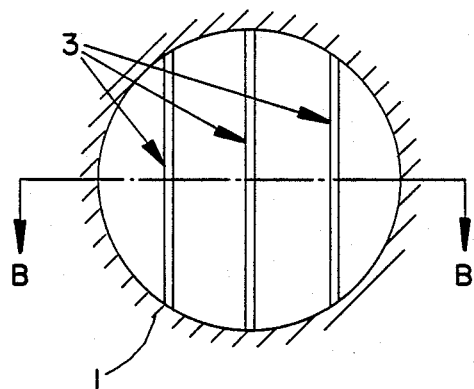
FIGS. 6, 6a and 6b show the velocity profile of fluid flowing past a flow straightener constructed in accordance with the principles of the present invention.
Figure 6A:
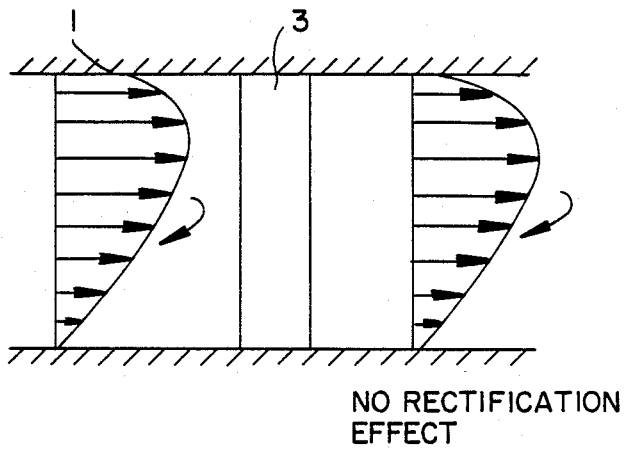
Figure 6B:
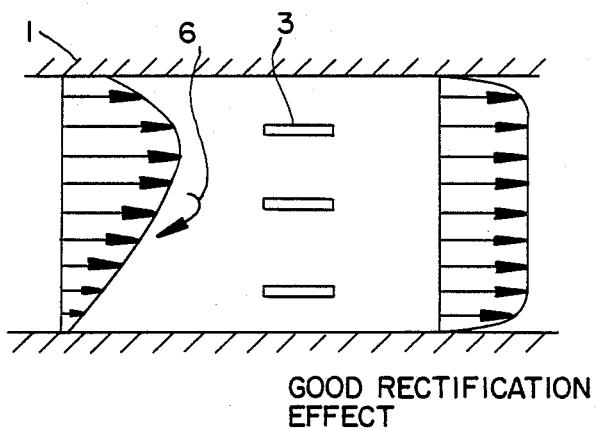

The flow straightener of the present invention also advantageously helps to provide a desired velocity profile for fluid flowing within the flowmeter body 1, as in shown in FIG. 6. The flow rectification in one direction can easily be visualized by studying FIG. 6. The skewness in the flow profile can be broken down into two components, one in the plane of vanes 3 (Section A—A) and another in the perpendicular direction (Section B—B). In the vane plane (A—A), the fluid particles move parallel to the vanes without adjustment, especially in the layers outside the vanes' boundary layers. Accordingly, the distortion in the approaching velocity profile along each vane passes without rectification (FIg. 6a). However, the skewness in the direction normal to the vane (FIG. 6b) is rectified an the velocity profile becomes symmetric downstream the vanes. The vanes guide the particles that have rotational motions 8 and force them to move parallel to the surface of the strip. While the present invention has been described in considerable detail, it will be understood that various changes and modifications would occur to those skilled in the art. Therefore, the foregoing should be considered descriptive, but not limitive, of the invention which is defined by the following claims.

What is claimed is:

1. A flow straightener for use in a substantially cylindrical fluid flow pipe, comprising at lease three vanes arranged with their longitudinal axis parallel to each other and equidistantly spaced apart from each other across a diameter of said pipe and wherein each vane has first and second oppositely disposed sides having a thickness t and third and fourth oppositely disposed sides having a depth d, said third and fourth sides being arranged substantially parallel to the direction of fluid flowing in said pipe, said depth d being in the range of 0.25 to 0.125 of the diameter D of said pipe and said thickness t being approximately 0.05 the diameter D of the pipe.

2. The flow straightener of claim 1, wherein said pipe further includes a fluid flow sensing element having a longitudinal axis disposed along a diameter of said pipe and wherein said vanes are arranged with their longitudinal axes substantially parallel to said longitudinal axis of said sensing element.

3. The flow straightener of claim 2 wherein said vanes are located upstream of said sensing element at a distance of 1 to 2 times the diameter D of the pipe.

4. The flow straightener of claim 1 wherein said vane has at least its upstream face rounded.

5. The flow straightener of claim 1 wherein said pipe includes a flange formed on an upstream end of said pipe and wherein said vanes are mounted in slots formed in said flange.

6. The flow straightener of claim 1 further including a plate having an opening with an internal diameter substantially equal to the diameter D of said pipe, said plate having equidistantly spaced-apart slots formed therein for receiving said vanes, said plate and vane assembly being mounted to a flange provided on an upstream end of said pipe.

7. A flow straightener for use in a substantially cylindrical fluid flow pipe, comprising at least three vanes arranged with their longitudinal axes parallel to each other and equidistantly spaced apart from each other across a diameter of said pipe, and wherein said pipe further includes a fluid flow sensing element having a longitudinal axis disposed along a diameter of said pipe and wherein said vanes are arranged with their longitudinal axes substantially parallel to said longitudinal axis of said sensing element and wherein said vanes are located upstream of said sensing element at a distance of 1 to 2 times the diameter D of the pipe.

8. The flow straightener of claim 7, wherein each vane has first and second oppositely disposed sides having a thickness t and third and fourth oppositely disposed sides having a depth d, said third and fourth sides being arranged substantially parallel to the direction of fluid flowing in said pipe, said depth d being in the range of 0.25 to 0.125 of the diameter D of said pipe and said thickness t being approximately 0.05 the diameter D of the pipe.

9. The flow straightener of claim 7 wherein said vane has at least its upstream face rounded.

10. The flow straightener of claim 7 wherein said pipe includes a flange formed on an upstream end of said pipe and where in said vanes are mounted in slots formed in said flange.

11. The flow straightener of claim 7 further including a plate having an opening with an internal diameter substantially equal to the diameter D of said pipe, said plate having equidistantly space-apart slots formed therein for receiving said vanes, said plate and vane assembly being mounted to a flange provided on an upstream end of said pipe.

* * * * *